Aug. 8, 1933.    F. E. GRAGG ET AL    1,921,290
VEHICLE SIDE SIGNAL
Filed April 3, 1929
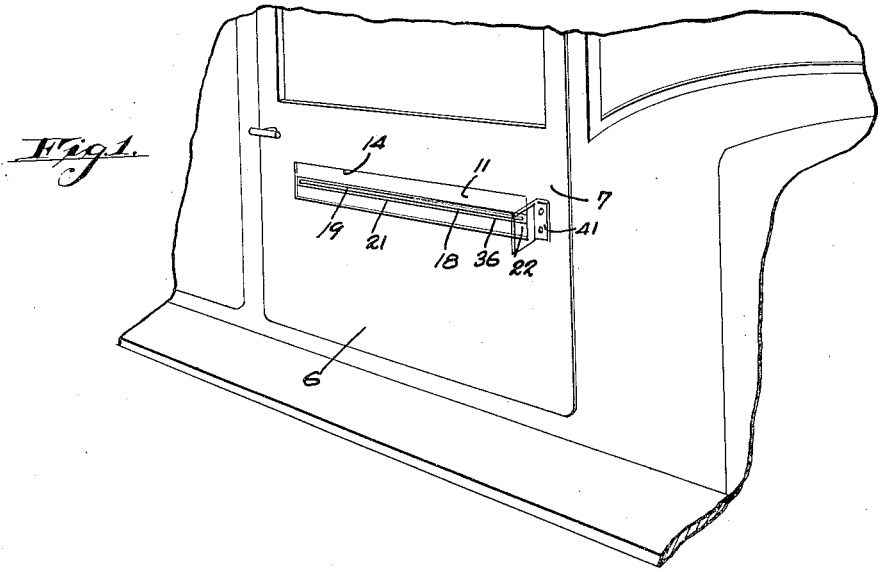
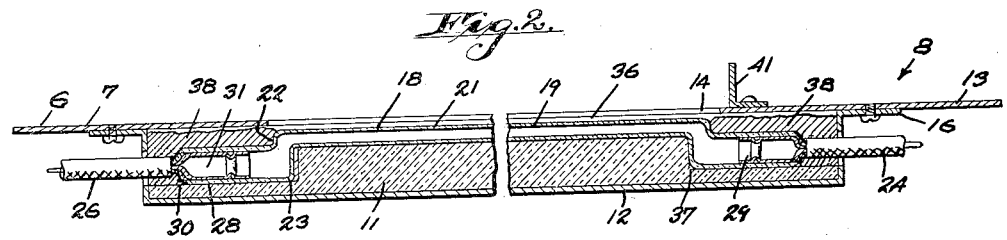
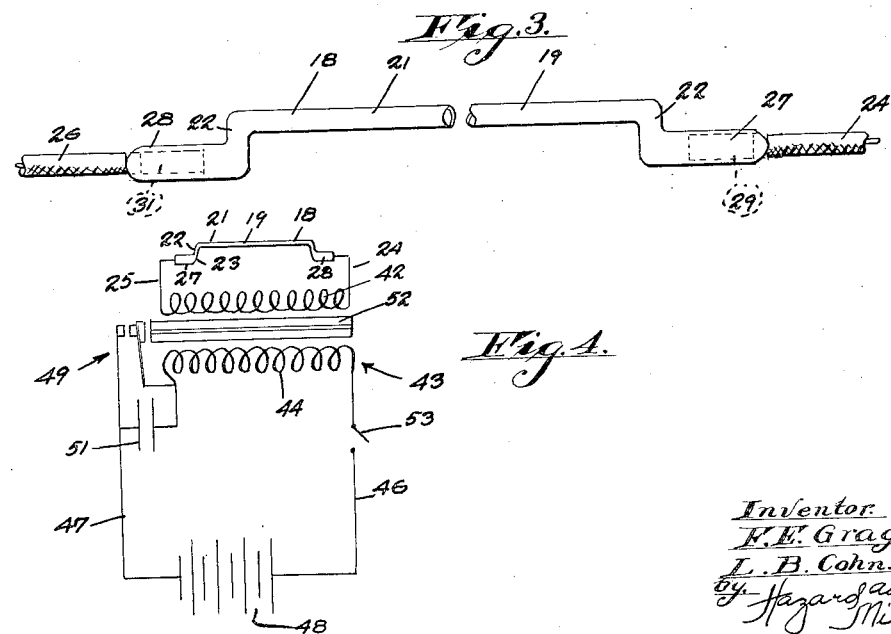
Inventor
F. E. Gragg
L. B. Cohn
by Hazard and Miller
Attorneys Patented Aug. 8, 1933

1,921,290

UNITED STATES PATENT OFFICE 1,921,290

VEHICLE SIDE SIGNAL

Frances Ethel Gragg and Leonard B. Cohn, Los Angeles, Calif.

Application April 3, 1929. Serial No. 352,275

2 Claims. (Cl. 177—329)

This invention relates to vehicle signals, and has for an object the provision of a signal adapted to be mounted upon the side of a vehicle, to enhance the visibility of the vehicle, to persons so positioned that they are unable to see either the headlights or the tail-light of that vehicle. As such, this signal serves the purpose of the well known "courtesy lamp" but is an improvement thereover, because of its greatly increased visibility, and because it possesses certain characteristics which add materially to its desirability for the use intended.

A more detailed object is the provision of a vehicle signal, one of the characteristic features of which, is that it possesses a luminous element such as a filament lamp, or a transparent tube filled with gas which is adapted to be energized to luminosity by the passage of current therethrough. Consequently, the principal portion of the device of the present invention, is in the form of a luminous, linear signal.

A further object is the provision of a luminous, linear signal as described, which is especially adapted to be mounted upon the side of such a vehicle as an automobile, either upon a rigid portion of the body, or in one of the door panels.

A still further object is the provision of a vehicle signal as described, which is provided with a backing strip for the luminous element, of relatively light color, this color also being preferably at sharp contrast with the predominating color of the vehicle.

Another object is the provision of means for protecting the luminous member from breakage, due to being struck by other objects, and also the provision of means for preventing the luminous element from being viewed from the front of the vehicle. This last detail is included as a result of the enactment in certain states, of regulations making it unlawful to carry on a vehicle, signals of certain colors which are visible from the front of the vehicle.

The invention possesses other objects and advantageous features, some of which, with those enumerated, will be set forth in the following description of the invention's particular embodiment which is illustrated in the drawing accompanying and forming a part of the specification.

Referring to the drawing:

Figure 1 is a perspective view of a portion of the side of an automobile, having the improved signal of our invention, mounted in operative position thereupon.

Fig. 2 is a horizontal, medial sectional view taken through the signal.

Fig. 3 is a top plan view of one form of luminous element forming an essential feature of our invention.

Fig. 4 is a diagram showing the electrical connections necessary for operating that form of luminous element of Fig. 3.

Accidents frequently occur at night, at crowded intersection, due to the difficulty encountered by the driver of one vehicle, in seeing another vehicle which is crossing the intersection ahead of him, and in a line at such angularity with his own line of travel, that he is unable to see either the headlight or tail-light of the vehicle crossing. The well known "courtesy lamp" goes a long way in eliminating this difficulty; but heretofore, these courtesy lamps have been merely in the form of a relatively small dome-like structure of selected color such as red or green, and carried upon the running-board. Hence, due to the shape and relatively small size of such signals, they are apt to cause confusion, inasmuch as they closely resemble a conventional tail-light, with the result that the driver of another vehicle, instead of realizing that a vehicle is crossing his path, will think that the vehicle carrying the courtesy lamp, is traveling in the same direction as his own vehicle. To overcome this difficulty, we have provided a vehicle side signal which is elongated, having a linear, luminous element disposed in a line substantially parallel to the line of travel of the vehicle. Constructing the signal of this peculiar configuration, not only adds to its visibility by increasing the size of the luminous element, but it adds significance to the signal, in that it readily shows the line of travel of the vehicle upon which it is mounted. By constructing the signal in such a manner that it is of exceedingly attractive appearance, it is made readily adaptable for mounting upon even the finest cars.

Specifically describing the invention in the most practical form thereof, of which we are at present aware, it is herein shown and described as being mounted within the lower panel 6 of a door 7 of an automobile indicated in its entirety at 8. However, it should be understood that we do not wish to be limited to this precise positioning of this device, as it is also within the scope of our invention, to mount it upon one of the rigid portions of the body, such as above the lintel of one of the doors, or upon the edge of the running-board, or in fact, in any other convenient location, permitting observation of the signal from one or both sides of the vehicle.

The present embodiment of the invention, comprises a backing strip 11 composed of any suitable material, preferably vitric in nature because of the translucence of such material and light in color, this color contrasting sharply with the predominating color of the vehicle upon which the signal is mounted. This feature adds to the visibility of the signal during daylight hours, as well as after dark. We have found the well known white opalescent glass to be excellently suited for this use.

The strip 11 is disposed within a casing 12 conveniently formed of sheet metal by means of which the strip 11 may be rigidly mounted against the inner face of the sheeting 13 forming the panel 6, it being understood that an aperture 14 has been provided in the sheeting 13, through which the outer face of the strip 11 is exposed to view from the side of the vehicle. The casing 12 is provided with flanges 16, to facilitate attachment thereof, to the inner face of the sheeting 13; or, if it be desired to avoid passing attaching screws through the sheeting 13 to be exposed to view from the outside, the casing 12 may be conveniently attached to one of the cross members forming the frame of the door 7.

Extending longitudinally of the strip 11, is a linear signal 18 adapted to be illuminated preferably by electrical energy. While we contemplate employing any one of various types of luminaries, we have found the well known neon tube to be peculiarly adapted for this work. Figs. 2 and 3 show such a type of luminous element wherein the tube 19 contains suitable gas adapted to be energized to luminosity by the passage of electric current therethrough. This tube is bent to provide an elongated portion 21 exposed to view, and extending longitudinally of the exposed surface of the strip 11. Right angle bends 22 and 23 are formed adjacent each end of the tube, to permit attachment thereto, of electrical conductors 24 and 26. These conductors are attached to the ends 27 and 28 respectively, of the tube 19, and establish electrical connection with the gas enclosed within the tube preferably by the conventional electrodes 29 and 31, respectively. Escape of gas from the tube 19, is prevented by sealing the end of the glass tube about the outer end of the electrode, with a conductor 30 communicating with the electrode, extending through the sealed end of the tube.

For the protection of the exposed portion 21 of the tube 19, it is preferably disposed within a groove 36 extending longitudinally of the exposed portion of the backing strip 11. This groove 36 is deepened adjacent each end of the strip 11, to provide recesses 37 for the reception of the ends 27 and 28 of the tube 19, the tube being held against inadvertent displacement, by wax 38 poured into these recesses 37, after the tube has been properly positioned in respect to the backing strip. Not only does seating the exposed portion 21 of the tube within a groove in the backing strip, serve to protect the tube against possible injury by being struck, but it also serves to prevent its being observed from the front of the vehicle. This is an important feature, in that in certain localities, regulations are enforced, preventing the employment upon any vehicle, of signals of certain colors such as red, which can be observed from the front of the vehicle. If desired, additional precaution may be exerted in this regard, by the provision of an opaque shield 41 secured to the side of the vehicle, just forward of the aperture 14, or to the exposed surface of the strip 11.

Fig. 4 shows a wiring diagram of the electrical connections for energizing the neon tube 19. The conductors 24 and 26 are connected to opposite ends of the secondary coil 42 of an induction coil indicated in its entirety at 43. A primary coil 44 is connected by conductors 46 and 47, to opposite terminals of a source of current such as a storage battery 48, the conductor 47 having vibrator points 49, and a condenser 51, connected in parallel with each other, and in series with the primary coil 44. The vibrator points 49 are adapted to be activated by a core 52 disposed within the magnetic field of the primary coil 44. The flow of current through the primary circuit, is controlled by means of a switch 53.

Thus when the switch 53 is closed, the primary coil 44 is energized, the vibrator points 49 normally being in circuit-closing position. However, this effects magnetization of the core 52, whereupon the points 49 are separated, breaking the primary circuit and thus de-energizing the primary coil 44. This permits the points 49 to again become connected, completing the primary circuit; this cycle of operations wherein the primary coil 44 is successively energized and de-energized at a relatively rapid rate, being continued as long as the switch 53 is kept closed. This rapid making and breaking of the primary circuit, will induce a high frequency current in the secondary coil 42; and the induction coil 43 is so proportioned that this high frequency circuit so induced, has the characteristics necessary for the proper energization of the gas within the tube 19, to effect its luminosity.

It is to be understood that the luminary may be of any selected color, such colors as red, green, and blue, being readily obtained by the employment of the well known neon tube. However, inasmuch as red and green are frequently employed as warning signals, and are understood by the public at large, to carry the import of a warning, these colors are those most preferred for the present use. Furthermore, and inasmuch as the strip 11, and tube 19, are arranged horizontally, they are disposed in substantial parallelism with the line of travel of the vehicle, with the result that an observer realizes almost instantly, the direction of travel of the vehicle, or the position occupied thereby. If the vehicle is stationary, this element is of considerable importance, in that confusion very frequently obtains at crowded intersections where the headlights of approaching vehicles, are so numerous and so glaring, that it is difficult for a driver of a vehicle, to readily appreciate just what positions are occupied by vehicles immediately in front of his own, and just what directions of travel they are pursuing.

By constructing the backing strip of translucent vitric material, the efficiency of our signal is materially enhanced because the translucent nature of such material permits light from the illuminated signal 18, to permeate the body of the strip and thus render luminous an area thereof, considerably wider than the light source 18 itself. It has been found that the effect produced by employing a backing strip of such characteristics, is that the backing strip is illuminated and tinged with the color of the light source, for an inch or an inch and a half, on each side of the light source 18, which, of course, adds materially to the visibility of the signal, causing it to present a very striking appearance, and thus increasing to a very great extent, its efficiency as a warning signal.

It is to be understood that the details of the invention as herein disclosed, are subject to alteration within the spirit or scope of the appended claims.

We claim:

1. A luminous signal for motor vehicles comprising a strip of light colored translucent vitric material having an elongated groove in its outer surface, a tubular lighting element substantially conforming to the shape of said strip and lying within said groove, and means connecting said lighting element into an electric circuit, said lighting element being directly visible from in front of said signal and said strip being adapted to conduct a portion of the light emitted by the back and sides of said lighting element and thereby illuminate the forward face of the strip to enhance the effulgence of light emitted by said signal.

2. A luminous signal for motor vehicles comprising a strip of light colored translucent vitric material having an elongated groove in its outer surface, a tubular lighting element substantially conforming to the shape of said strip and lying within said groove, and means connecting said lighting element into an electric circuit, said lighting element being directly visible from in front of said signal and said strip being adapted to conduct a portion of the light emitted by the back and sides of said lighting element and thereby illuminate the forward face of the strip to enhance the effulgence of light emitted by said signal, and the illumination of said forward face of said strip decreasing gradually as the distance from said groove increases.

FRANCES ETHEL GRAGG.
LEONARD B. COHN.